United States Patent [19]

Tice et al.

[11] 4,049,194
[45] Sept. 20, 1977

[54] FIREPLACE/FORCED AIR FURNACE HEAT GENERATION AND DISTRIBUTION SYSTEM

[76] Inventors: Vernon Lawton Tice, 2 Olney Mill Court; Donald Francis Glover, 4128 Sir Walter Road, both of Olney, Md. 20832

[21] Appl. No.: 665,310

[22] Filed: Mar. 9, 1976

[51] Int. Cl.² ............................. F24B 7/00; F24J 3/02
[52] U.S. Cl. ..................................... 237/1 A; 237/51; 126/271; 126/121; 126/122
[58] Field of Search .......................... 237/51, 53, 1 A; 126/120–122, 125, 110 R, 99 R

[56] References Cited

U.S. PATENT DOCUMENTS

| | | | |
|---|---|---|---|
| 2,186,539 | 1/1940 | Slayter et al. | 237/51 |
| 2,484,292 | 10/1949 | Hermanson | 237/51 |
| 2,749,905 | 6/1956 | Johnson | 126/110 R |
| 3,834,619 | 9/1974 | Glover | 126/121 |
| 3,877,459 | 4/1975 | Harvey | 126/113 |
| 3,880,141 | 4/1975 | Abshear | 126/121 |
| 3,942,509 | 3/1976 | Sasser | 126/121 |
| 3,958,755 | 5/1976 | Cleer, Jr. | 237/1 A |

*Primary Examiner*—John J. Camby
*Assistant Examiner*—Henry C. Yuen
*Attorney, Agent, or Firm*—Michael J. McGreal

[57] ABSTRACT

The present heat generation distribution system comprises a forced air central furnace heating system having combined therewith an open hearth fireplace heat exchanger device connected in a manner that there is a positive pressure within the fireplace heat exchange device created by means of the blower on the central furnace. Preferably the conduit for feeding air to the fireplace heat exchanger takes air from the plenum chamber of the central furnace with the air being returned after passage through the fireplace heat exchange device to the main hot air distribution duct. Also, heated air being returned from the fireplace heat exchange device can be passed into the cold air return duct. Further, the fireplace may contain a liquid heating means which liquid transfers heat to a heat storage material which is stored in a heat storage container. Heat can then be transferred from this heat storage container and passed to a heat exchanger in the main hot or cold air duct to aid in providing heated air to the building. Optionally this heat storage container receives heat from a solar heat collector.

14 Claims, 6 Drawing Figures

FIREPLACE/FORCED AIR FURNACE HEAT GENERATION AND DISTRIBUTION SYSTEM

This invention relates to a system for optimizing use of heat sources in the heating of a structure such as a dwelling. More particularly this invention relates to using a standard fireplace in combination with a forced air heating system in order to provide the heating needs of a dwelling.

There is a continual need to minimize the wastage of heat energy. In building structures such as the standard dwelling, the fireplace is used almost completely for decorative purposes, and when used, its transfer of heat energy to the dwelling is generally less than about 10%. A prime reason for the low transfer of heat energy from a fireplace to the dwelling is that essentially only radiant heat transfers from the fireplace. The greater amount of heat generated exits the dwelling up the chimney flue.

In order to overcome this loss of so much heat energy, heat exchange devices of many different disigns have been placed in, or structurally incorporated into the fireplace. These have included devices utilizing air or a liquid such as water as the heat exchange medium. These have been placed in the fireplace itself and/or in the chimney. In construction of these devices it is the aim to capture as much of the fireplace heat as possible. To this end there is the general objective to expose large surface areas to the fireplace heat source and in most instances the heat transfer air or liquid is forced through the heat exchange device. Illustrative of such devices is that of U.S. Pat. No. 3,880,141.

Various systems have also been advised to utilize the heat derived from a fireplace heat exchanger throughout the dwelling. Illustrative of such systems are those of U.S. Pat. Nos. 2,186,539 and 2,572,888. These U.S. Patents disclose systems where the air in a forced air heating system, after having been heated in the main furnace of the system, is further heated by flowing all of this heated air through a fireplace and optionally a chimney heat exchange means. This, however, presupposes that the fireplace will be in use for a large percentage of the time when the dwelling requires heat; otherwise, substantial furnace heat would actually be lost to these heat exchange devices. Also, it would be difficult to modify present fireplaces to accommodate such systems.

A system which requires that only a portion of the air which is used to heat the dwelling flow through the fireplace heat exchanger is described in U.S. Pat. No. 3,834,619. In the system of this patent, air is drawn in through the fireplace heat exchange device, then into and through the furnace for further heating, and then is distributed throughout the building structure. In this system only a portion of the air in the system flows through the open hearth heat exchange device. However, in this system, since the air is drawn in through the fireplace heat exchange device by means of the forced air furnace blower fan, there exists a pressure within this heat exchange device which is slightly less than the prevailing atmospheric pressure. Although very remote, if any leakage from the fire in the fireplace into the heat exchange device occurs there is the possibility that some fireplace combustion products can enter the heating system. Therefore, it is preferred that a positive pressure exist in the fireplace heat exchange device. The present invention is directed to such a concept.

Briefly, the present invention consists of a heat distribution system wherein a portion of the air which flows from a forced air furnace is flowed under a positive pressure into a fireplace heat exchanger, and then back into the forced air heating system for distribution throughout the building structure. Optionally the fireplace heat exchange device can include means for also heating a liquid such as water, which is then flowed to a heat storage container. The heat stored in the heat storage container can then be used to heat air on the hot or cold side of the forced air furnace. That is, heated liquid from the heat storage container can then be flowed through heat exchange devices in the heated air distribution main duct and/or the cold air return duct. This heat storage container may also optionally receive heat from a solar heat collector panel which is conveniently placed on, or made a part of the roof of the building structure. This system optimizes the use of the fireplace to provide heat to a building. It also provides a convenient method for incorporating a solar unit into the central heating system. This system further has the prime advantage of minimizing the demand on the forced air system central furnace, and thus conserves fuel.

The present invention is further described in the following drawings.

Figure 1:
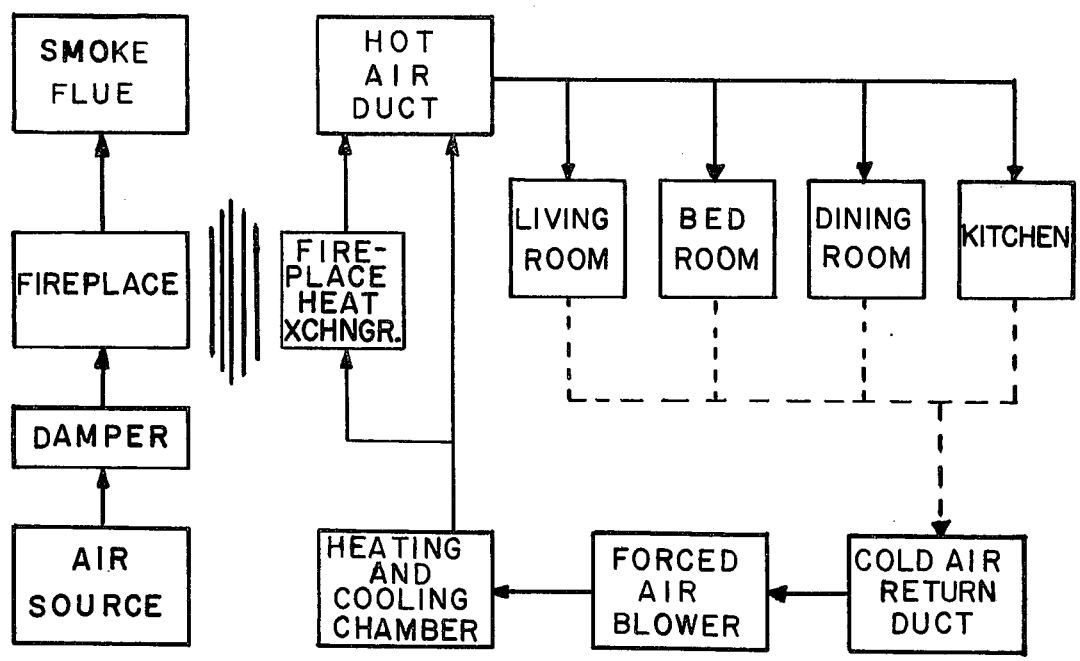
FIG. 1 is a schematic drawing of the combines positive pressure fireplace heat exchanger forced air furnace heating system.

In more detail, the schematic diagram of FIG. 1 described the operation of a fireplace such as an open hearth fireplace in combination with a conventional forced air heating system. The forced air heating system consists of an air blower fan, a furnace wherein air is heated, a plenum chamber located after the furnace and which may optionally include an air conditioning A frame heat exchanger, duct work for delivering the heated air to the various rooms, and duct work to return air to the blower for recycle through the system. The fireplace operates independently of the forced air heating system except for being in indirect heat exchange relationship with the forced air heating system. The fireplace part of the system will usually consist of the open hearth having a heat exchange means therein, an air source which provides air for combustion to the fireplace and a smoke flue for removing combustion products from the fireplace. In most instances the combustion air is provided from the room in which the fireplace is located and the smoke flue is a standard chimney.

The vertical lines between the box designated "Fireplace" and that designated "Fireplace Heat Exchanger" signifies an indirect heat exchange relationship. In operation, air in the various rooms of a building such as the living room, bedrooms, dining room, and kitchen, is drawn into the Cold Air Return Duct by means of the Forced Air Blower which then propels the air through the furnace heat exchange unit and thence into the plenum chamber which is usually located above the furnace heat exchange unit (Heating and Cooling Chamber) in updraft furnace systems. The plenum chamber will also contain the A frame air conditioning heat exchange tower when the system incorporates air conditioning. At a point in the plenum chamber or just beyond in the main Hot Air Duct, a portion of the air which has been heated in the furnace is taken off and flowed through the Fireplace Heat Exchanger. Usually less than half of the available air will be flowed through the fireplace heat exchange unit. The remainder of the air flows through the hot air duct. The air from the Fireplace Heat Exchanger re-enters the forced air system in the hot air duct at a point downstream from where the air left the forced air system to be flowed through the Fireplace Heat Exchanger. Preferably the duct which returns the air to the forced air heating system is positioned so that the air from the Fireplace Heat Exchanger is aspirated into the forced air heating system duct.

The advantage of this means, combining the Fireplace Heat Exchanger and the forced air system, is that there will be a positive pressure within the Fireplace Heat Exchanger. That is, since the blower fan is forcing air into the Fireplace Heat Exchanger, there will exist a greater than atmospheric pressure within the Fireplace Heat Exchange Unit. A positive pressure within the Fireplace Heat Exchange Unit will preclude the drawing in of any fireplace combustion products in case of a leak in the Fireplace Heat Exchange Unit.

As a further embodiment of this invention, it is an option that the return to the forced air system from the Fireplace Heat Exchanger can be to the cold air return duct of the forced air heating system. In this embodiment air is both pushed and pulled through the Fireplace Heat Exchanger. However, in any manner in which the fireplace heat exchanger is connected to the cold air return duct, the pressure within the fireplace heat exchange device will be greater than the prevailing atmospheric pressure. This means of interconnection of the fireplace heat exchanger to the forced air system provides for flowing large volumes of air through the fireplace heat exchanger. This is a very efficient interconnection technique and fully utilizes the blower fan of the forced air heating system.

Figure 2:
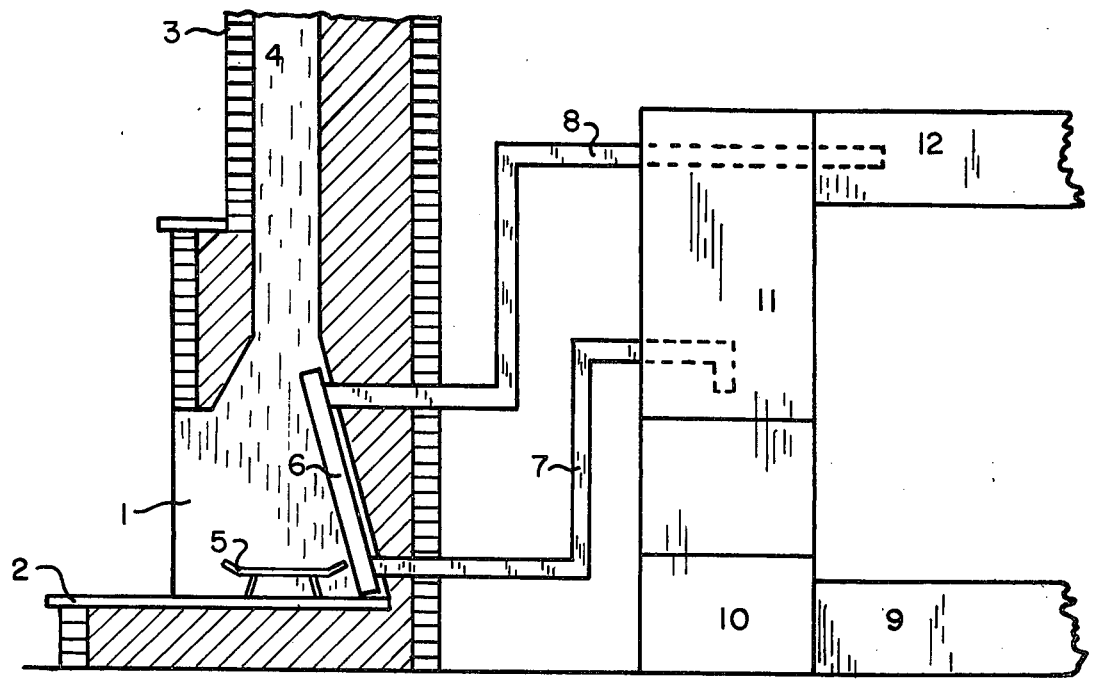
FIG. 2 is a partial section of the combined fireplace and forced air heating system of FIG. 1 illustrating the interconnection of the fireplace heat exchanger to the plenum chamber and the hot air duct.

FIG. 2 is an elevational section of the interconnection of the Fireplace Heat Exchanger and the forced air system of FIG. 1. The open hearth fireplace 1 consists of floor 2 and brickwork 3 which defines chimney flue 4. The grate 5 holds the fuel, usually wood, durning burning. This open hearth fireplace has a heat exchange unit 6 for absorbing heat from combustion in the fireplace. Air is provided to this fireplace heat exchange unit in this embodiment from plenum chamber 11. Blower 10 draws air from Cold Air Return duct 9, passes this air through a furnace heat exchange unit and thence to the phenum chamber 11. Part of this air is forced into conduit 7, through fireplace heat exchange unit 6, through conduit 8, and back into the forced air system at Hot Air Duct 12. The pressure of the air within the Fireplace Heat Exchange unit is above atmospheric pressure, thereby providing a system wherein the furnace blower maintains a positive pressure in the Fireplace Heat Exchange Unit.

Figure 3:
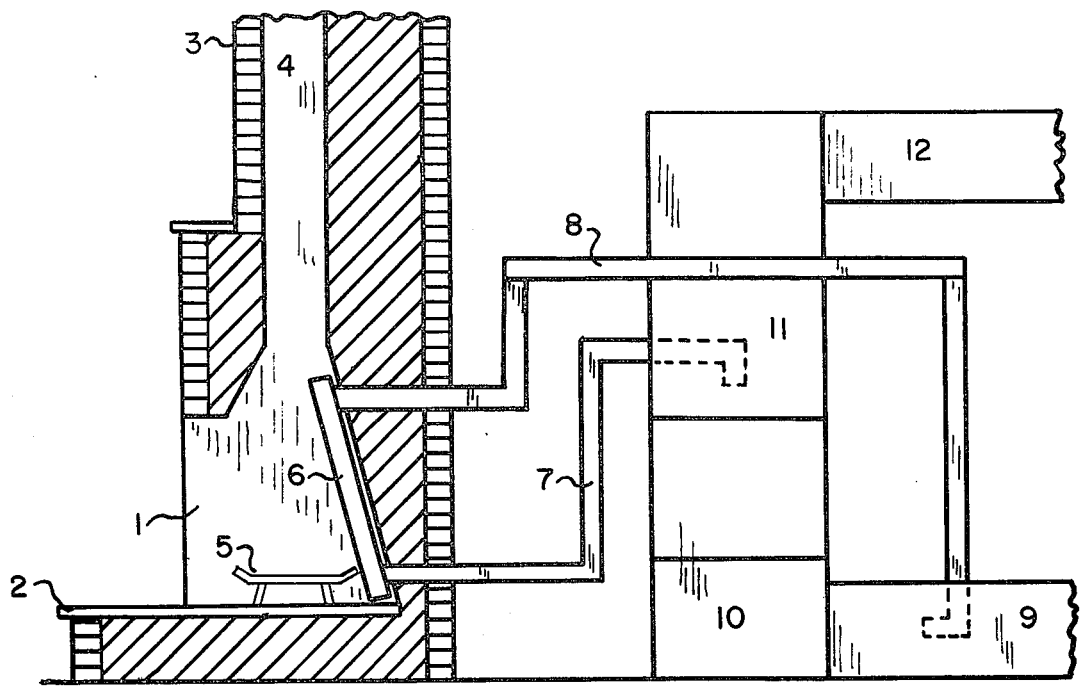
FIG. 3 illustrates in partial section a system similar to that of FIG. 2 but wherein the fireplace heat exchanger interconnects to the plenum chamber and cold air duct.

FIG. 3 illustrates the embodiment where air from the Fireplace Heat Exchanger is flowed to the cold air return duct of the forced air heating system. In this embodiment the conduit 8 interconnects the Fireplace Heat Exchanger 6 to the cold air return duct 9. This interconnection provides both a push and pull on the air flowing through the Fireplace Heat Exchanger. Air is forced into the Fireplace Heat Exchanger by the furnace blower fan and is drawn into the cold air return duct by the pull of the blower fan. The air flows are adjusted by means of pipe sizes and/or dampers so that there exists a positive pressure within the Fireplace Heat Exchange Unit. One or more dampers can be placed in the conduits which flow air to or from the Fireplace Heat Exchange Unit, or can be placed in the plenum chamber or hot air duct to force more air into the Fireplace Heat Exchanger Unit. There are other modifications of the system which are within the scope of the present invention. One of these is that the size of the conduit, where it enters the cold air return duct can be restricted to further create a positive pressure throughought the Fireplace Exchange system. There are yet other modifications that are obvious in view of the present disclosure.

Figure 4:
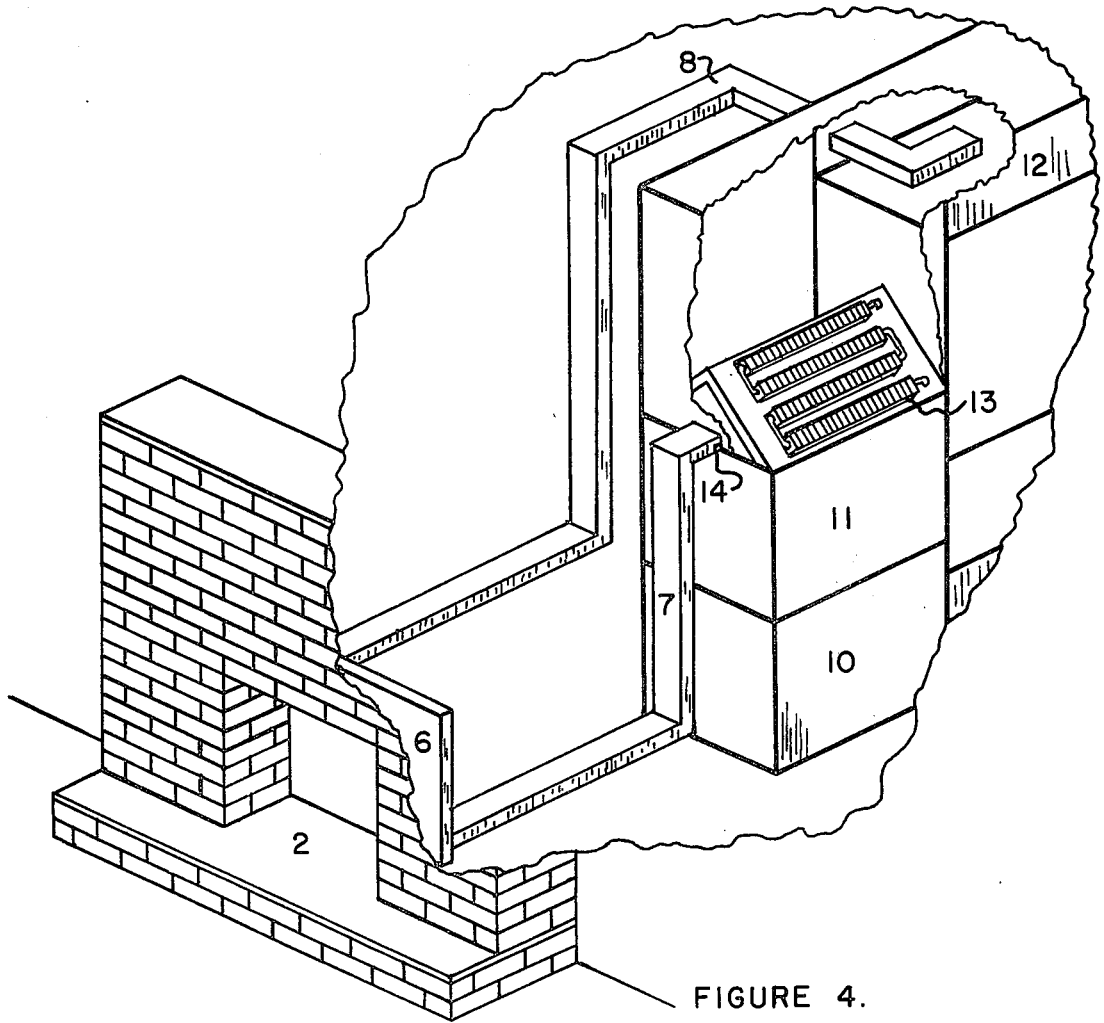
FIG. 4 is a partial section showing the interconnection of the fireplace heat exchanger to a forced air heating system which also includes an air conditioning unit having an A frame heat exchange tower.

FIG. 4 illustrates a preferred embodiment where the forced air heating system also includes a central air conditioning unit. The plenum chamber 11 contains the A frame heat exchanger unit 13. In this embodiment the opening 14 of conduit 7, which flows air to the Fireplace Heat Exchanger 6 is located between the A frame heat exchange unit and the blower. By using this mode of interconnection of the Fireplace Heat Exchanger to the forced air heating system the back pressure created by the A frame heat exchange unit increases the pressure at opening 14 and forces a substantial amount of air into conduit 7. By taking the air in at this opening 14, and discharging from conduit 8 into hot air duct 12, there is maintained a well defined positive pressure (also greater than atmospheric) within fireplace heat exchange unit 6. Further, there will also be a positive pressure within fireplace heat exchange unit 6 if the return to the forced air furnace system is to the cold air return duct. The furnace of the system is designated as 26.

Figure 5:
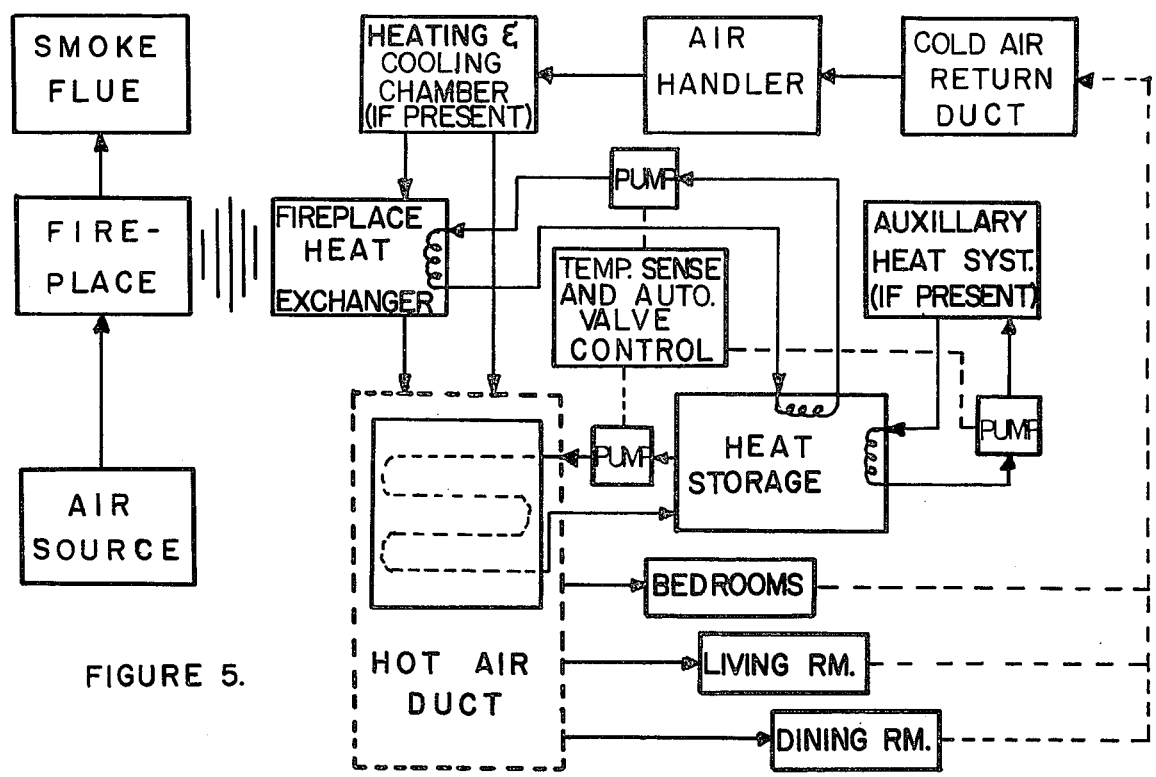
FIG. 5 is a schematic diagram of the basic system of FIG. 1, but having as incorporated parts, a liquid heating means in the fireplace, a heat storage container, and an auxiliary heating means such as a solar collector.

FIG. 5 is in essence the system of FIG. 1 with the added features of a heat storage means such as a heat storage container. In this embodiment the open hearth fireplace also contains a heat exchange coil through which a liquid is circulated. This liquid is circulated to a Heat Storage Container designed to store heat. That is, the container is well insulated so that there is a negligible loss of heat. The Heat Storage Container may be a tank where the water itself is stored or it may be a container which has a heat storage material such as, or similar to Sodium Sulfate Decahydrate or Sodium Thiosulphate Pentahydrate therein. Materials such as these store many times more heat than water since they pass from the solid to liquid state and back during use. The latent heat of fusion is utilized to store more heat than is possible with water or a similar liquid. In this embodiment, heat exchange coils deliver heat to such a heat storage material andextract heat therefrom. Heat which is stored in the container is from time to time removed for use. Either the stored water solution in the Heat Storage Container or a liquid which takes up heat from the Heat Storage Container, depending on the heat storage technique, is circulated through a heat exchange coil located in the Hot Air Duct of the forced air heating system.

This coil provides a superheat to the air leaving the plenum chamber of the furnace, or can be used as the sole source of heat with or without a furnace. That is, the demand for heat from the structure in which the system is located would initiate the flow of heated liquid to the heat exchange coil in the Hot Air Duct. If the heat from this coil is sufficient to satisfy the needs of the structure a furnace, if available, would not be used. However, if more heat is required, the furnace would also be used.

The Heat Storage Container may also receive heat from other than the coil in the fireplace. Such a heat source can conveniently be a solar panel which heats air or a liquid when it is flowed through the panel. Such an auxiliary heater means for the heat storage material greatly increases the efficiency of the system.

Any standard liquid pumps can be used to circulate the liquids used in the system, whether the liquids are in the heated or cooled condition. The liquid itself may be any regularly used heat exchange liquid. A preferred liquid is water with an additive such as ethylene glycol which increases the heat capacity of the liquid and reduces its freezing point. Such a liquid containing ethylene glycol is necessary when a solar panel auxiliary heater is used in the system.

Now in full description of FIG. 5, air from the various rooms of a structure is drawn into the Cold Air Return Duct by the blower. This air passes to the Heating-/Cooling Chamber (Furnace/Air conditioner) including the plenum chamber. A part of this air is flowed through the Fireplace Heat Exchanger while the remainder of the air flows directly to the Hot Air Duct which distributes the heated air back to the various rooms. The air which flows through the Fireplace Heat Exchanger enters back into the system in the region of the Hot Air Duct. This air in combination with the air which passed through the Fireplace Heat Exchanger is then heated by passage in contact with the Heat Storage Liquid Coil. This combined and heated air then flows to the various rooms of the structure.

As in FIG. 1, the Fireplace which contains the Fireplace Heat Exchanger is in indirect heat exchange with the Fireplace Heat Exchanger. That is, the heat from combustion in the Fireplace provides heat to the Fireplace Heat Exchanger.

This embodiment, as has been previously discussed, is essentially the same as that of FIG. 1 except that it includes a liquid heating means in the fireplace, and an auxiliary heating device. The combustion in the fireplace heats this liquid which is recirculated to the heat storage container by a conventional pump. This heated liquid is then stored or is used to heat a heat storage material. The heated liquid or the heat storage material heats a liquid which is then flowed to the heat liquid coil in the Hot Air Duct by a pump. The pumps to recirculate the liquid are preferably controlled by temperature sensitive controls such as thermostats. That is, when the fireplace is in use the liquid is flowed for heat exchange in order to pick up heat. And when the structure requires heat, the heated liquid is pumped from the Heat Storage container to the Heat Storage Liquid Coil in the Hot Air Duct.

This system also contains an Auxiliary Heat System. This can be a fuel fired boiler such as a hot water heater or preferably is a solar heat collector. In such an instance, a water solution is pumped to the auxiliary heat system, heated and then flowed to the Heat Storage Container. In the embodiment where the Auxiliary Heater System is a solar panel the heat is collected at almost zero cost.

It is also contemplated that an air circulating solar panel can be used. In such a solar panel, air will be the circulating medium in place of water, and will transfer its heat to a heat storage material such as, or similar to Sodium Sulfate Decahydrate or Sodion Thiosulphate Pentrahydrate. Although air is not as efficient as a liquid in taking up heat, air circulating systems are effective in various climates.

Figure 6:
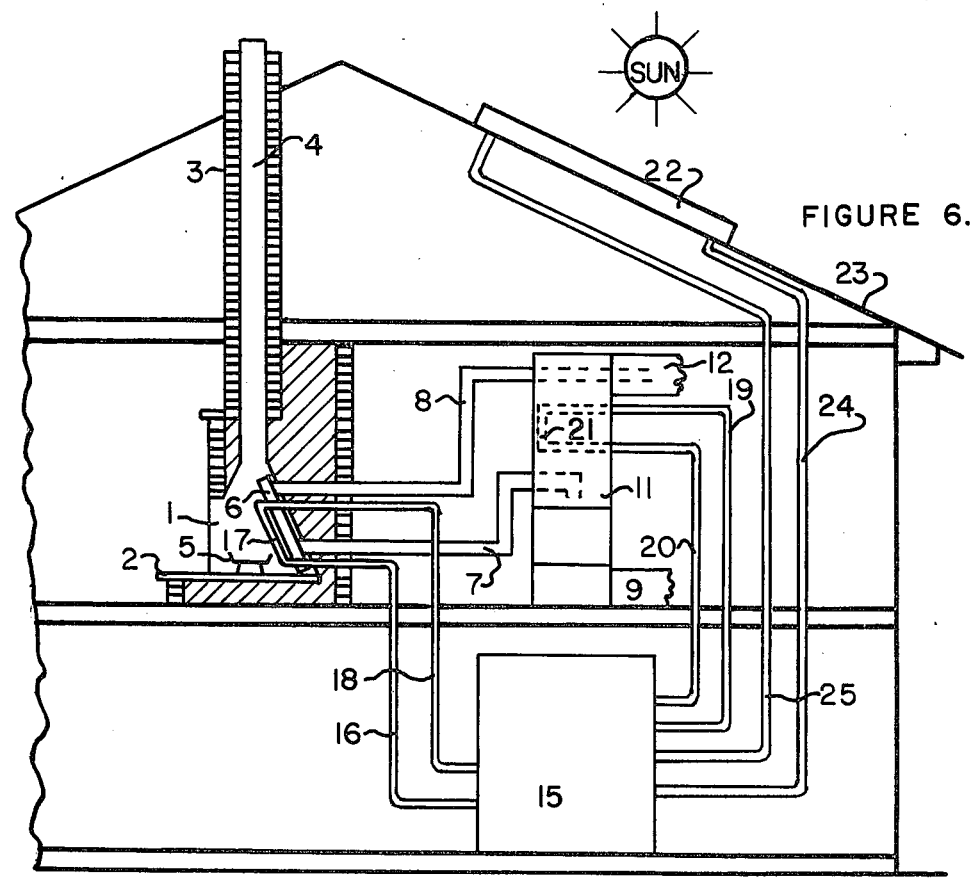
FIG. 6 is a sectional view of a building which utilizes the heat generation and distribution system of FIG. 4.

FIG. 6 sets out the utilization of the schematic process of FIG. 5 with the Auxiliary Heating System being solar panels. This figure sets out the physical design of the system of FIG. 5. This physical design includes the components of FIG. 2, along with the additional parts required to provide a heat storage technique. The components which are common to FIG. 2 are the open hearth fireplace 1, the floor 2 of the fireplace, the chimney 3 with flue area 4, the fuel holder 5, fireplace heat exchanger 6 with duct 7 to receive air and duct 8 for returning heated air to the central heating system, and forced air heating system parts, cold air return duct 9, blower fan 10, furnace plenum 11 and hot air duct 12. The remaining parts shown in FIG. 6 are part of the liquid section which is used to provide heat storage and for quick heat delivery to the structure. This liquid heat exchange section consists of Heat Storage Container 15 with pipe 16 delivering liquid to Liquid Heat Exchanger 17 in the fireplace and pipe 18 for returning the heated to Heat Storage Container 15. The liquid in the Heat Storage Container 15 is also heated by means of solar panels 22 located on the roof 23 of the structure. A liquid is circulated to the solar panels through pipe 25 and returned to the Heat Storage Container via pipe 24. The liquids are circulated by means of a further pump P to Heat Storage Liquid Coil 21 located in the plenum chamber or the Hot Air Duct via pipe 20 and returned to Heat Storage Container 15 by pipe 19. The Heat exchange means 21 delivers heat to the air which is to be circulated to the various rooms of the structure.

The system of FIG. 6 will also contain heat sensors such as thermostats, photocells or time controllers for controlling the pumps P used for circulating the liquid. That is, the solar panels 22 will be used only during daytime hours, and then only when there is sufficient sun energy to heat the liquid. Likewise the liquid is circulated through heat exchanger 17 only when there is combustion in the fireplace. And further, the heated liquid is flowed to heat exchange means 21 only when the structure requires heat and the liquid temperature is substantially above the heated air passing by heat exchange means 21. These control devices may be of any standard type readily commercially available. Also, the solar panels may be purchased from one of several manufacturers or constructed according to various known technology.

This combined system of FIG. 6 is an optimization of heat which would not otherwise be used. There is maximum use of the solar heat which strikes the roof of the structure and a utilization of the heat from a fireplace which would normally pass up the chimney flue. These sources can provide a substantial amount of the heat for the structure and if the fireplace is heavily used, can be used to supply the full heat needs of a structure. That is, the furnace of the forced air system would end up being used as an auxiliary heat source rather than the prime heat source. There would result a very considerable conservation of energy. In addition, the fireplace uses a source of fuel which is replenishable.

The present invention can be a part of a new system or adapted into the present forced air heating system of a building. That is, it can be designed into a new system or retro-fitted into present systems.

Various modifications can be made to the systems of the figures and yet be within the present concept of using a positive pressure open hearth heat exchanger to use fireplace generated combustion with a forced air heating system for energy in heating a structure. That is, the blower of the forced air heating system provides the flow through the fireplace heat exchanger as well as through the forced air heating system. The use of this blower fan to perform these two functions provides economies in design and operation. Obvious variations from the systems of figures includes the use of a hot water heater in place of the solar panels, a difference in the design of the various heat exchangers, or the use of equivalent system control devices. Also, the fireplace can be of the modified open hearth type. By modified open hearth is meant a fireplace having transparent panels or doors across the front which allows the radiant energy to transfer into the room. Air to support combustion can be taken from the room through a special vent or can be supplied from the exterior of the building. However, all such obvious variations are considered to be an integral part of the systems of this patent specification.

What we claim is:

1. A method for distributing heat energy in a fireplace to a plurality of rooms of a structure using the forced air heating of said structure comprising:
   a. providing said fireplace with a heat exchange device;
   b. providing a forced air heating system containing interconnected in sequence as components thereof return air conduit means, a fan air moving means, an air heating means, a plenum chamber, and distribution air conduit means whereby in operation said distribution air conduit means delivers air to a plurality of rooms and said return air conduit means removes air from said plurality of rooms;
   c. driving a portion of air from the plenum chamber of said forced air heating system into said fireplace heat exchange device by means of said fan air moving means of said forced air heating system;
   d. flowing said portion of air through said fireplace heat exchange unit at a positive pressure created by said fan air moving means; and
   e. flowing said portion of air now in a heated condition back into said forced air heating system at a point in one of said air conduit means components of said forced air heating system.

2. An improved fireplace heat distribution system comprising:
   a. a fireplace containing a heat exchange device therein;
   b. a forced air heating system containing interconnected in sequence as components thereof return air conduit means, a blower fan air moving means, an air heating means, a plenum chamber, and distribution air conduit means whereby in operation said distribution air conduit means delivers air to a plurality of rooms and said return air conduit means removes air from said plurality of rooms;
   c. a first opening in said fireplace heat exchange device to receive a portion of air from said forced air heating system and a second opening on said heat exchange device to remove heated air therefrom; and
   d. first interconnecting conduit means for flowing air to be heated to said fireplace heat exchanger from said forced air heating system and second interconnecting conduit means for flowing heated air to said forced air heating system from said fireplace heat exchange device, each connected at one end to said first and second openings respectively of said fireplace heat exchange device with the other end of said second interconnecting conduit means connected to said forced air heating system at a point in one of said air conduit means components thereof, with said other end of said first interconnecting conduit means connected to said forced air heating system at a point in the plenum chamber of said forced air heating system whereby said fan air moving means of said forced air heating system causes a forced flow therethrough and provides pressure of greater than prevailing atmosphere pressure within said fireplace heat exchange device.

3. A fireplace heat distribution system as in claim 2 wherein said other end of said first interconnecting conduit means is connected to said plenum chamber between the blower fan and and said air heating means and said other end of said second interconnecting conduit means is connected to said forced air heating system at a point beyond said air heating means.

4. A fireplace heat distribution system as in claim 3 wherein said fireplace heat exchange device contains a liquid heating means, first liquid conduit means for flowing a liquid to and into said liquid heating means from a heat storage container and second liquid conduit means for flowing a heated liquid from said liquid heating means to said heat storage container.

5. A fireplace heat distribution system as in claim 4 wherein there is a heat exchange means in the distribution air conduit means of said forced air heating system for transferring heat from said heated liquid to the air within said distribution air conduit means with third liquid conduit means for flowing said heated liquid from said heat storage container to said heat exchange means in said distribution air conduit means and fourth liquid conduit means for flowing said heated liquid from said heat exchange means in said distribution air conduit means to said heat storage container.

6. A fireplace heat distribution system as in claim 5 including an auxiliary heat means for heating said heated liquid and fifth liquid conduit means for flowing said heated liquid to said auxiliary heat means from said heat storage container and sixth liquid conduit means for flowing said heated liquid from said auxiliary heat means to said heat storage container.

7. A fireplace heat distribution system as in claim 6 having first pump means for flowing said heated liquid from said heat storage container to and through said auxiliary heat means, second pump means for flowing said heated liquid from said heat storage container to and through said heat exchange means in said distribution air conduit means and temperature responsive means actuated by the heat demand on said heat distribution system for controlling said first and second pump means.

8. A fireplace heat distribution system as in claim 7 wherein said auxiliary heat means is a solar energy collector.

9. A fireplace heat distribution system as in claim 2 wherein said other end of said second interconnecting conduit means is connected to said forced air heating system at a point in the return air duct of said forced air heating system.

10. A fireplace heat distribution system as in claim 9 wherein said fireplace heat exchange device contains a liquid heating means, first liquid conduit means for flowing a liquid to said liquid heating means from a heat storage container and second liquid conduit means for flowing a heated liquid from said liquid heating means to said heat storage container.

11. A fireplace heat distribution system as in claim 10 wherein there is a heat exchange means in the distribution air conduit means of said forced air heating system with third liquid conduit means for flowing said heated liquid from said heat storage container to said heat exchange means in said distribution air conduit means and fourth liquid conduit means for flowing said heated liquid from said heat exchange means in said distribution air conduit means to said heat storage container.

12. A fireplace heat distribution system as in claim 11 including an auxiliary heat means for heating said heated liquid and fifth liquid conduit means for flowing said heated liquid to said auxiliary heat means from said heat storage container and sixth liquid conduit means for flowing said heated liquid from said auxiliary heat means to said heat storage container.

13. A fireplace heat distribution system as in claim 12 having first pump means for flowing said heated liquid from said heat storage container to and through said auxiliary heat means, second pump means for flowing said heated liquid from said heat storage container to and through said additional heat exchange means in said distribution air conduit means, and temperature responsive means actuated by the heat demand on said heat distribution system for controlling said first and second pump means.

14. A fireplace heat distribution system as in claim 13 wherein said auxiliary heat means is a solar energy collector.

* * * * *